(12) United States Patent
Oobuchi et al.

(10) Patent No.: US 6,376,085 B1
(45) Date of Patent: Apr. 23, 2002

(54) JOINING MATERIAL FOR ELECTRONIC COMPONENTS ELECTRONIC COMPONENTS AND A METHOD FOR MANUFACTURING THE SAME

(75) Inventors: Takeshi Oobuchi, Nagoya; Yasunori Koda, Inuyama, both of (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 09/256,856

(22) Filed: Feb. 24, 1999

(30) Foreign Application Priority Data

Feb. 25, 1998 (JP) .................................. 10-059108

(51) Int. Cl.$^7$ .......................... B32B 15/01; H01G 4/12
(52) U.S. Cl. ................... 428/432; 428/693; 428/699; 428/701; 428/702; 501/32; 501/138
(58) Field of Search .................. 428/428, 432, 428/446, 693, 699, 700, 701, 702, 900; 501/32, 138

(56) References Cited

U.S. PATENT DOCUMENTS

| 4,610,969 A | 9/1986 | Wada et al. |
| 4,772,985 A | 9/1988 | Yasumoto et al. |
| 4,882,650 A | 11/1989 | Maher et al. |

FOREIGN PATENT DOCUMENTS

| EP | 0 533 162 A | 3/1993 |
| JP | 7-120605 | 12/1995 |
| JP | 8-36913 | 2/1996 |

*Primary Examiner*—Deborah Jones
*Assistant Examiner*—Jennifer McNeil
(74) *Attorney, Agent, or Firm*—Burr & Brown

(57) ABSTRACT

A joining material for an electronic component is disclosed. The component has a plurality of functional layers, each selected from a magnetic layer and dielectric layer and the functional layers are joined with each other. The joining material is comprises a glass and a composition of a mol % of ZnO, b mol % of BaO and c mol % of TiO$_2$ (a=12–45, b=4–45, c=18–81, a+b+c=100), wherein 0.1 to 10 weight parts of the glass is added to 100 weight parts of the composition.

12 Claims, 7 Drawing Sheets

(1 of 7 Drawing Sheet(s) Filed in Color)

JOINING MATERIAL FOR ELECTRONIC COMPONENTS ELECTRONIC COMPONENTS AND A METHOD FOR MANUFACTURING THE SAME

BACKGROUND OF THE INVENTION

1. Technical Field

The invention relates to a joining material for an electronic component, such as capacitors, inductors, resistors, stacked type and coaxial type dielectric filters, stacked type LC filters, composite LC components and composite LCR modules, an electronic component and a method for manufacturing same.

2. Related Arts

When manufacturing a stacked type dielectric filter, a paste for an internal layer electrode is printed on each of a predetermined number of greensheets, which are then laminated to produce laminated greensheets. These laminated greensheets are then sintered at a temperature of 700° C. to 1100° C. to produce a base body with the internal layer electrodes. After the base body is polished, a metal paste for an outer electrode is printed on predetermined regions on the surface of the body and fired to form the outer electrodes. A composite LC filter with an inductor and capacitor is also known.

When producing such composite electronic components, a predetermined number of greensheets for, for example, a dielectric layer and magnetic layer are laminated to provide laminated greensheets, which are then co-fired to join the magnetic and dielectric layers. It is also known to provide a greensheet of a joining layer between the greensheets of the magnetic and dielectric layers to provide laminated greensheets which are then co-fired. In Japanese publication Tokkohei 120605/1995, a ceramic material, obtained by firing a mixture of ZnO, $TiO_2$, an CuO, is used for the joining layer for preventing peeling between the dielectric layers and magnetic layers and diffusion of the ingredients of both layers with each other. In Japanese patent application publication Tokkaihei 36913/1997, a ceramic material is provided between the dielectric and magnetic layers for improving the adhesive strength of the layers and for preventing diffusion of the ingredients of both layers with each other, the ceramic material being obtained by mixing a glass contained in the dielectric layer with a ceramic of 15 to 40 mol % of BaO and 60 to 85 mol % of $TiO_2$ and firing.

SUMMARY OF THE INVENTION

However, according to the inventor's research, warp may occur in the magnetic or dielectric layer depending on the compositions of both layers and their firing schedule. When the amount of warp is out of the specification for manufacturing a filter, such filter with impermissible warp is discarded as being defective, thus decreasing its manufacturing yield. The inventors further found that warp was also induced in the layers during the sintering process.

The object of the invention is, in an electronic component having a plurality of functional layers each selected from a magnetic layer and dielectric layer and joined with each other, to prevent warp in the magnetic layers or the dielectric layer.

The invention provides a joining material for an electronic component having a plurality of functional layers each selected from a magnetic layer and dielectric layer, the functional layers being joined with the joining material to each other, the joining material comprising a glass and a composition of a mol % of ZnO, b mol % of BaO and c mol % of $TiO_2$ (a=12–45, b=4–45, c=18–81, a+b+c=100), wherein 0.1 to 10 weight parts of the glass is added to 100 weight parts of the composition.

The invention also provides a joining material for the electric component, the joining material comprising a glass and a composition of a mol % of ZnO, b mol % of BaO, c mol % of $TiO_2$ and d mol % of MnO (a=12–45, b=4–45, c=18–81, d≦10, a+b+c+d=100), wherein 0.1 to 10 weight parts of the glass is added to 100 weight parts of the composition.

The invention also provides a joining material for the electric component, the joining material comprising a glass and a composition of a mol % of ZnO, b mol % of BaO, c mol % of $TiO_2$ and e mol % of $Al_2O_3$ (a=12–45, b=4–45, c=18–81, e≦10, a+b+c+e=100), wherein 0.1 to 10 weight parts of the glass is added to 100 weight parts of the composition.

The invention also provides a joining material for the electric component, the joining material comprising a glass and a composition of a mol % of ZnO, b mol % of BaO, c mol % of $TiO_2$, d mol % of MnO and e mol % of $Al_2O_3$ (a=12–45, b=4–45, c=18–81, d≦10, e≦10, a+b+c+d+e=100), wherein 0.1 to 10 weight parts of the glass is added to 100 weight parts of the composition.

The invention also provides an electronic component having the functional layers and a joining layer for joining the adjacent functional layers, wherein the joining layer is composed of a sintered product of each of the joining materials. That is, a layer composed of each of the joining materials is fired to form the joining layer. The joining layer is made of the sintered product obtained by firing the joining material.

The invention also provides an electronic component having the functional layers and a joining layer, wherein the joining layer is composed of sintered product showing at least one of a peak corresponding to $BaNd_2Ti_5O_{14}$ and a peak corresponding to $BaNd_2Ti_4O_{12}$ when measured by means of powdery X-ray diffraction method.

The invention also provides a method for manufacturing an electronic component having the functional layers and a joining layer, the method comprising the steps of:

laminating the functional layers already sintered to provide a laminated body, wherein a layer made of each of the joining materials is provided, and firing the joining material to form the joining layer.

The invention also provides a method for manufacturing an electronic component having the functional layers and a joining layer, the method comprising the steps of:

laminating greensheets, for the functional layers, to provide laminated greensheets, wherein a layer made of each of the joining materials is provided, and firing the laminated greensheets with the layer made of the joining material to form the functional layers and the joining layer.

The inventors researched the above described warp of a dielectric layer or magnetic layer and finally made the following discovery. According to state-of-the-art knowledge, it is possible to improve the adhesive strength and therefore to prevent the peeling of the magnetic and dielectric layers, by adjusting the thermal expansion coefficient of joining ceramics between the magnetic and dielectric layers to those of both layers.

However, in actual manufacturing, depending on the selection of materials for the magnetic and dielectric layers and sintering schedule, even when the thermal coefficient of the joining ceramics is adjusted to those of the magnetic and dielectric layers, warp may be observed during the sintering process. This phenomenon probably means that the magnetic, dielectric and joining layers shrink at different firing shrinkage rates at certain or even almost any time point during the sintering.

The inventors, based on the above discovery, successfully provide a solution. That is, the above warp may be considerably decreased or even prevented, on a wide variety of materials for magnetic and dielectric layers, by providing a joining material according to the above specific compositions.

In the above compositions, for further reducing the warp of the magnetic or dielectric layer, a content of ZnO (a mol %) may preferably be 25 to 40 mol %, a content of BaO (b mol %) may preferably be 5 to 15 mol %, and a content of $TiO_2$ (c mol %) may preferably be 45 to 65 mol %.

A glass contained in the inventive joining material may preferably be selected from a group consisting of $ZnO$—$SiO_2$—$B_2O_3$ glass, $PbO$—$B_2O_3$—$SiO_2$ glass, $Al_2O_3$—$CaO$—$B_2O_3$—$SiO_2$ glass, $B_2O_3$—$SiO_2$ glass, $MgO$—$Al_2O_3$—$SiO_2$ cordierite glass, and $ZnO$—$MgO$—$Al_2O_3$—$SiO_2$ cordierite glass, and most preferably be $ZnO$—$SiO_2$—$B_2O_3$ glass. These glasses may further contain $TiO_2$, $ZrO_2$ or $Y_2O_3$.

The greensheets for the inventive joining layer may be made brown, by adding not more than 10 mol % of MnO to the inventive joining material, to distinguish the brown-colored greensheet from greensheets for magnetic and dielectric layers. The joining layer may also be colored by adding at least one metal oxide selected from a group consisting of $Cr_2O_3$, $Fe_2O_3$ and NiO.

Not more than 10 mol % of $Al_2O_3$ may be added to the inventive joining material to further improve the adhesive strength of functional layers. Not more than 10 mol % of at least one metal oxide selected form a group consisting of $Y_2O_3$ and $ZrO_2$ may be also added to the inventive joining material to further improve the adhesive strength of adjacent functional layers.

More than 10 mol % of MnO added to the joining material might reduce the adhesive strength between the functional layers. More than 10 mol % of $Al_2O_3$ added to the joining material might increase the warp of functional layers.

In the invention, at least one of the functional layers functions as an element in an equivalent circuit, and therefore functions as an electronic device layer. Such electronic device layer includes inductor, capacitor and resistor layers. The inductor layer may preferably comprise a magnetic layer and an inductor, such as a coil, as a conductor embedded within the magnetic layer. The capacitor layer may preferably comprise a dielectric layer and a capacitor as a conductor embedded within the dielectric layer. The magnetic layer means a layer made of a magnetic material, in the invention.

The invention is particularly suitable for a composite electronic component, preferably being an LC filter, stacked type dielectric filter or an LCR integrated substrate.

The dielectric layer may be preferably made of a $TiO_2$, $TiO_2$ CaO, $BaO$—$TiO_2$, $BaO$—$TiO_2$—$Nd_2O_3$, $BaO$—$TiO_2$—$Nd_2O_3$—$Bi_2O_3$, $BaO$ $TiO_2$—$ZnO$, $BaO$—$Al_2O_3$—$SiO_2$, $MgO$—$CaO$—$TiO_2$, $BaO$—$MgO$—$Ta_2O_5$ or $Al_2O_3$ series oxide. Such oxide may include a glass, which is preferably selected from $B_2O_3$—$SiO_2$, $CaO$—$B_2O_3$—$SiO_2$, $CaO$—$Al_2O_3$—$B_2O_3$—$SiO_2$ and $CaO$—$Al_2O_3$—$TiO_2$—$SiO_2$ series glasses.

The magnetic layer may preferably be made of a $Fe_2O_3$—$NiO$—$CuO$—$ZnO$, $Fe_2O_3$—$NiO$—$CuO$—$ZnO$—$SiO_2$, $NiO$—$ZnO$, or $CuO$—$ZnO$ or feroux planar series oxide. These magnetic material may contain not more than 5 weight percent of CoO or MnO, and about 1 weight percent of SiO, CaO, PbO, or $Bi_2O_3$ constituting a glass. When applying these materials, warp may be induced more often, thus increasing the need for the invention.

When the joining layer has a thickness of not smaller than 10 $\mu$m, an amount of warp may be considerably reduced and the tensile strength thereof may be improved. The upper amount of the thickness is not particularly limited, however, the layer with a thickness of not larger than 500 $\mu$m is practical.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 1 is a view schematically showing an LC filter, and FIG. 2 is a perspective view needed for manufacturing an LC filter of FIG. 1.

As shown in FIG. 2, greensheets 7A, 7B, 7C, 7D, 7E, 7F, 7G, 7H and 71 for an inductor layer, a greensheet 8 for a joining layer, and greensheets 9A, 9B, 9C, 9D, 9E, 9F, 9G, 9H, 9J for a capacitor layer are laminated. Conductor paste areas 13A are printed on the greensheets 7B to 7H for inductor layers, according to a coil pattern designed by a lamped parameter circuit. Conductor paste areas 14A are printed on the greensheets for a capacitor layer, according to a capacitor pattern designed by a lamped parameter circuit.

Figure 1:
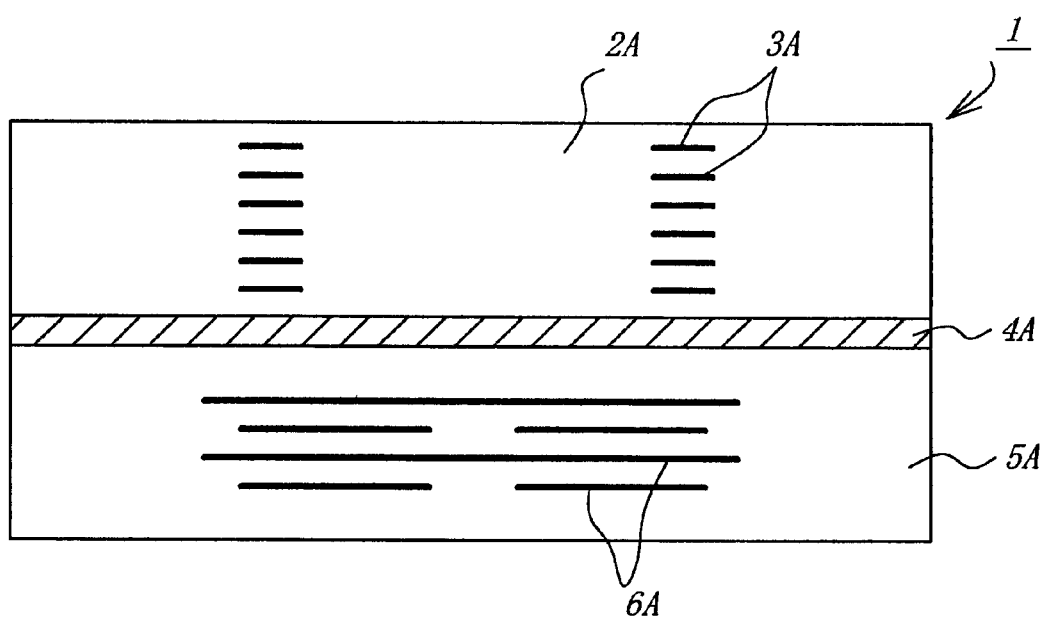
FIG. 1 is a view schematically showing an LC filter suitable for applying the invention.

These greensheets are laminated and heat-pressed to provide laminated greensheets, which are then cut into a predetermined shape to provide a cut body. The cut body is sintered at a temperature of 800 to 950° C. and further subjected to barrel polishing. Paste for an outer electrode is printed on the surface of the sintered body according to a predetermined pattern, dried and then fired at a temperature of 500 to 850° C. to provide an LC filter shown in FIG. 1. The thus obtained LC filter comprises an inductor layer 2A, a joining layer 4A and a capacitor layer 5A. 3A is a coil pattern and 6A is a capacitor pattern.

Figure 3:
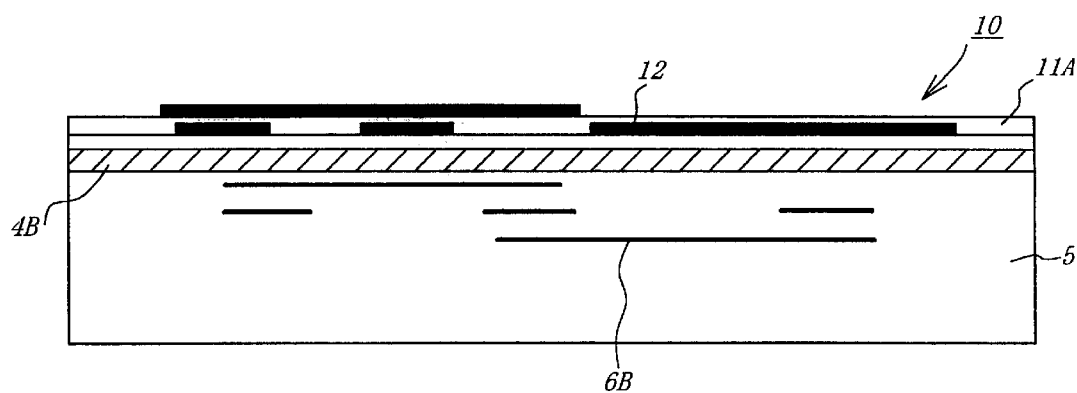
FIG. 3 is a view schematically showing a stacked type dielectric filter suitable for applying the invention.
Figure 4:
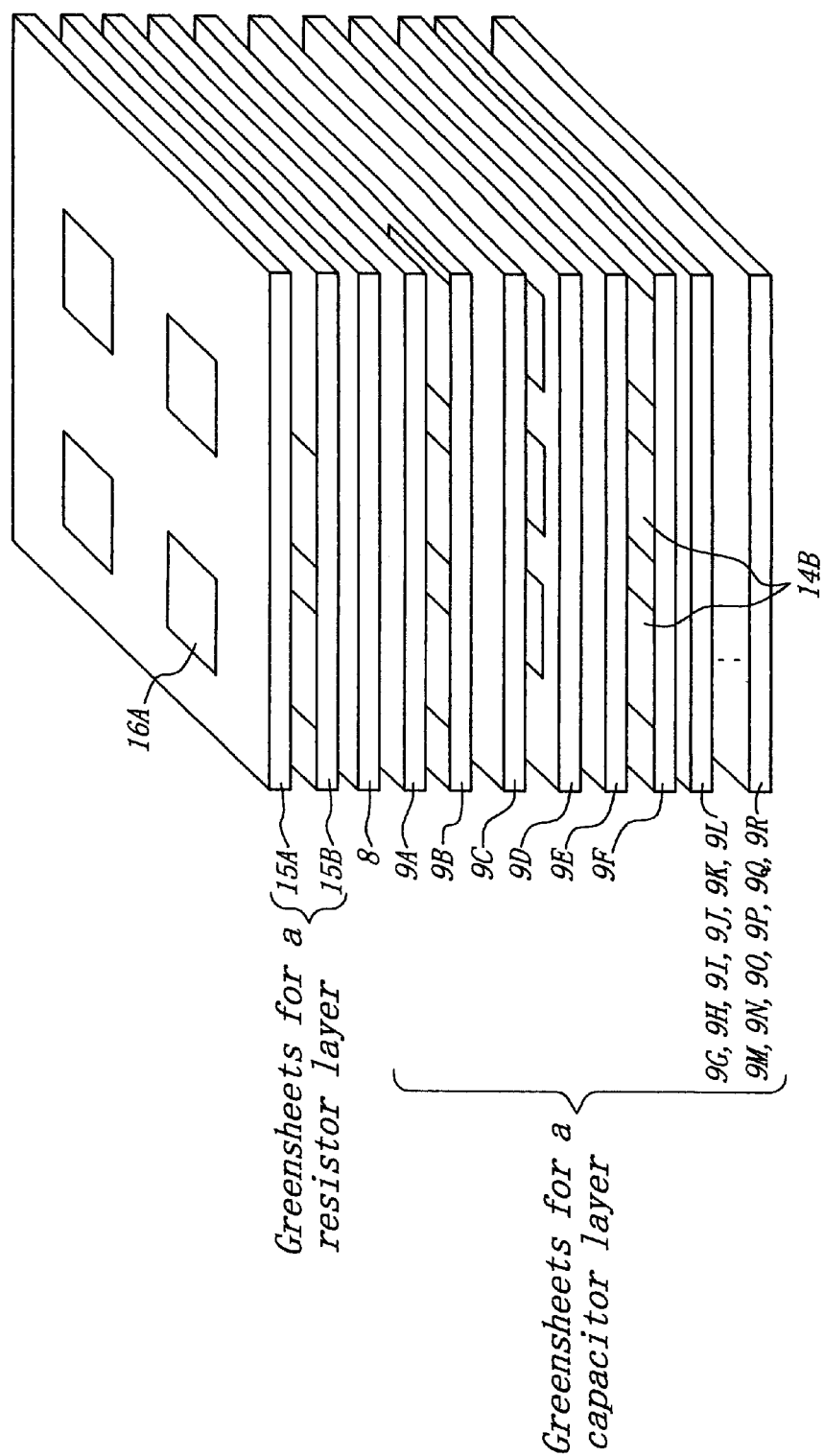
FIG. 4 is a perspective view showing greensheets needed for manufacturing the filter of FIG. 3.

FIG. 3 is a view schematically showing a stacked type dielectric filter, and FIG. 4 is a perspective view showing greensheets needed for manufacturing the filter of FIG. 3.

As shown in FIG. 4, greensheets 15A and 15B for resistor layers, a greensheet 8 for a joining layer and greensheets 9A to 9R for a capacitor layer are laminated. Conductor paste areas 16A are printed on the greensheet 15A, according to an electrode pattern designed for connection with an outer mounting part or inner conductors. Resistor paste areas 16A are printed on the greensheet 15B, according to a connecting-electrode pattern designed by a distributed constant circuit, or lamped parameter circuit, or the combination thereof. Capacitor patterns 14B, designed by a distributed constant circuit, or lamped parameter circuit, or the combination thereof, are printed on the greensheets 9B, 9C, 9D, 9E and 9F for a capacitor layer.

These greensheets are laminated and heat-pressed to provide laminated greensheets, which are then cut into a predetermined shape to provide a cut body. The cut body is sintered at a temperature of 700 to 1100° C. and further subjected to barrel polishing. Paste for an outer electrode is printed on the surface of the sintered body according to a desired pattern, dried and then fired at a temperature of 500 to 900° C. to provide a filter 10 shown in FIG. 3. The thus obtained filter comprises a resistor layer 11A, a joining layer 4B and a capacitor layer 5B. 12 is a connecting electrode pattern and 6B is a capacitor pattern.

Figure 5:
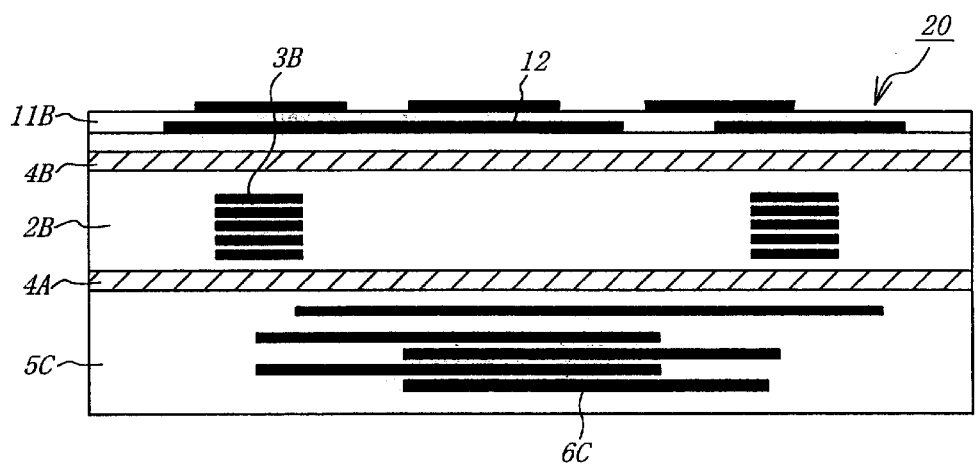
FIG. 5 is a view schematically showing a stacked type LCR filter suitable for applying the invention.
Figure 6:
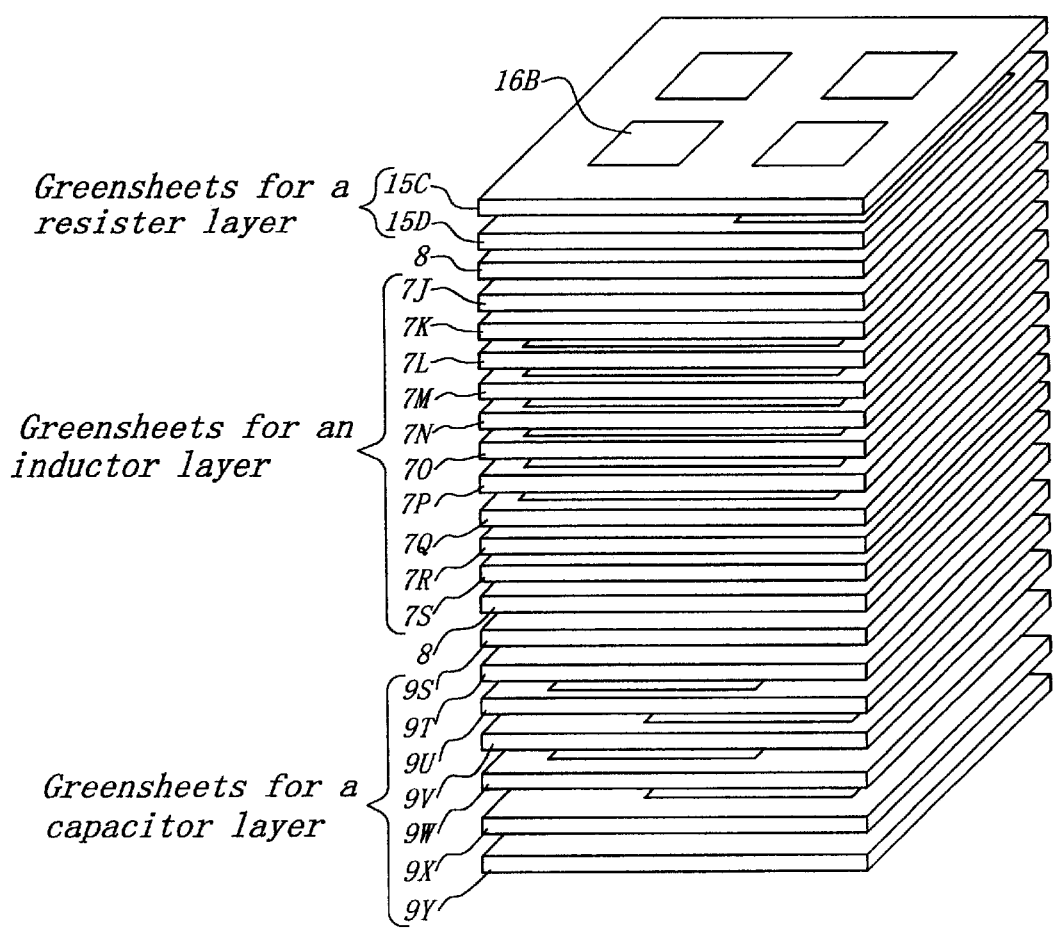
FIG. 6 is a perspective view showing greensheets needed for manufacturing the filter of FIG. 5.
Figure 7:
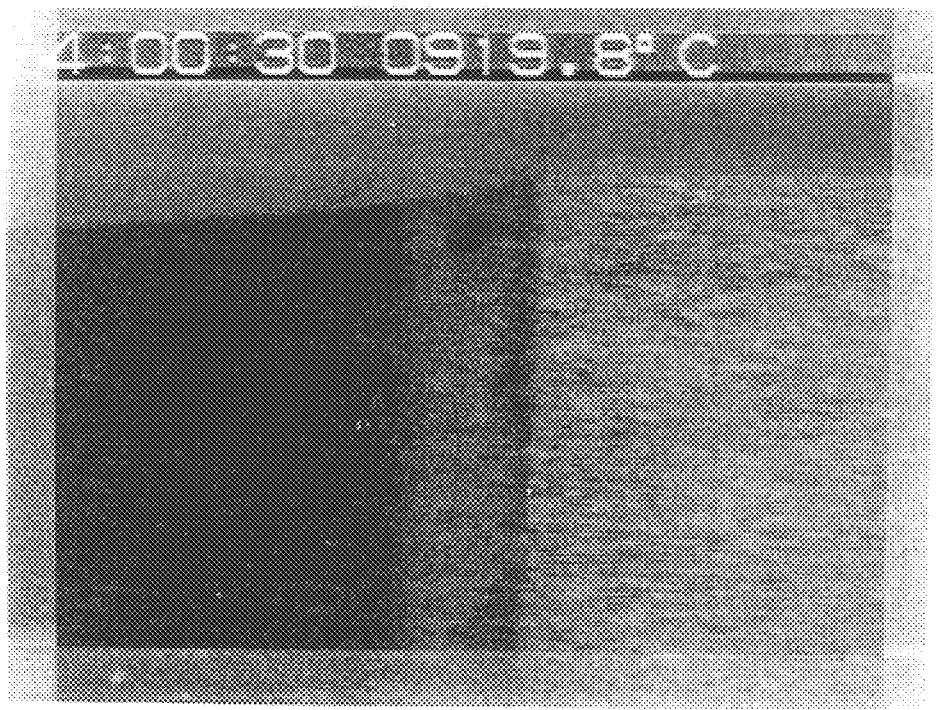
FIG. 7 is a photograph showing a polished surface of the filter sintered according to experimental number 16 within the invention.
Figure 8:
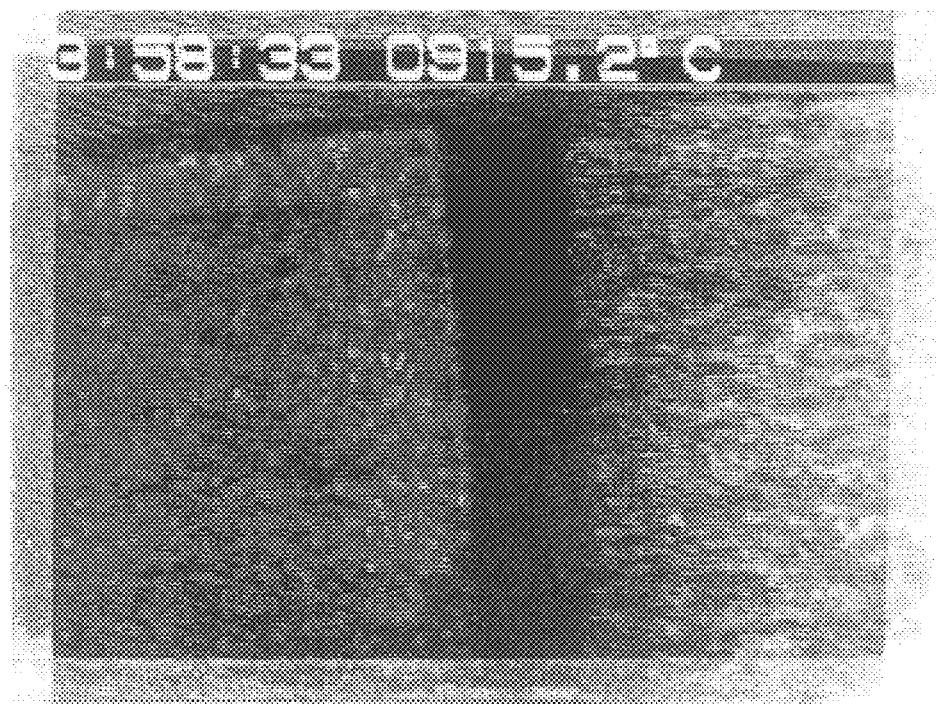
FIG. 8 is a photograph showing a polished surface of the filter sintered according to control experimental number 19 outside of the invention.

FIG. 5 is a view schematically showing a stacked type LCR filter, and FIG. 6 is a perspective view showing greensheets needed for manufacturing the filter of FIG. 5.

As shown in FIG. 6, greensheets 15C and 15D for resistor layers, a greensheet 8 for a joining layer, greensheets 7J, 7K, 7L, 7M, 7N, 7O, 7P, 7Q, 7R and 7S for an inductor layer another greensheet 8, and greensheets 9S, 9T, 9U, 9V, 9X and 9Y for a capacitor layer are laminated. Conductor paste areas 16B are printed on the outer greensheet 15C, according to an electrode pattern designed for connection with a surface mount part or inner conductors. Paste regions for electrodes are printed on the greensheet 15D, according to a coil pattern designed by a distributed constant circuit, or lamped parameter circuit, or the combination thereof. Paste regions for electrodes are printed on the greensheets 7L to 7Q for an inductor layer, according to an inductor pattern designed by a distributed constant circuit, or lamped parameter circuit, or the combination thereof. Paste regions for electrodes are printed on the greensheets 9U, 9V, 9W and 9X for a capacitor layer, according to a capacitor pattern designed by a distributed constant circuit, or lamped parameter circuit, or the combination thereof.

These greensheets are laminated and heat-pressed to provide laminated greensheets, which are then cut into a predetermined shape to provide a cut body. The cut body is sintered at a temperature of 700 to 1100° C. and further subjected to barrel polishing. Paste for an outer electrode is printed on the surface of the sintered body according to a desired pattern, dried and then fired at a temperature of 700 to 1100° C. to provide an LCR filter 20 shown in FIG. 5. The thus obtained filter comprises a resistor layer 11B, joining layers 4A and 4B, an inductor layer 2B and a capacitor layer 5C. 12 is a connecting-electrode pattern and 3B is a coil pattern.

Experiment A

Figure 2:
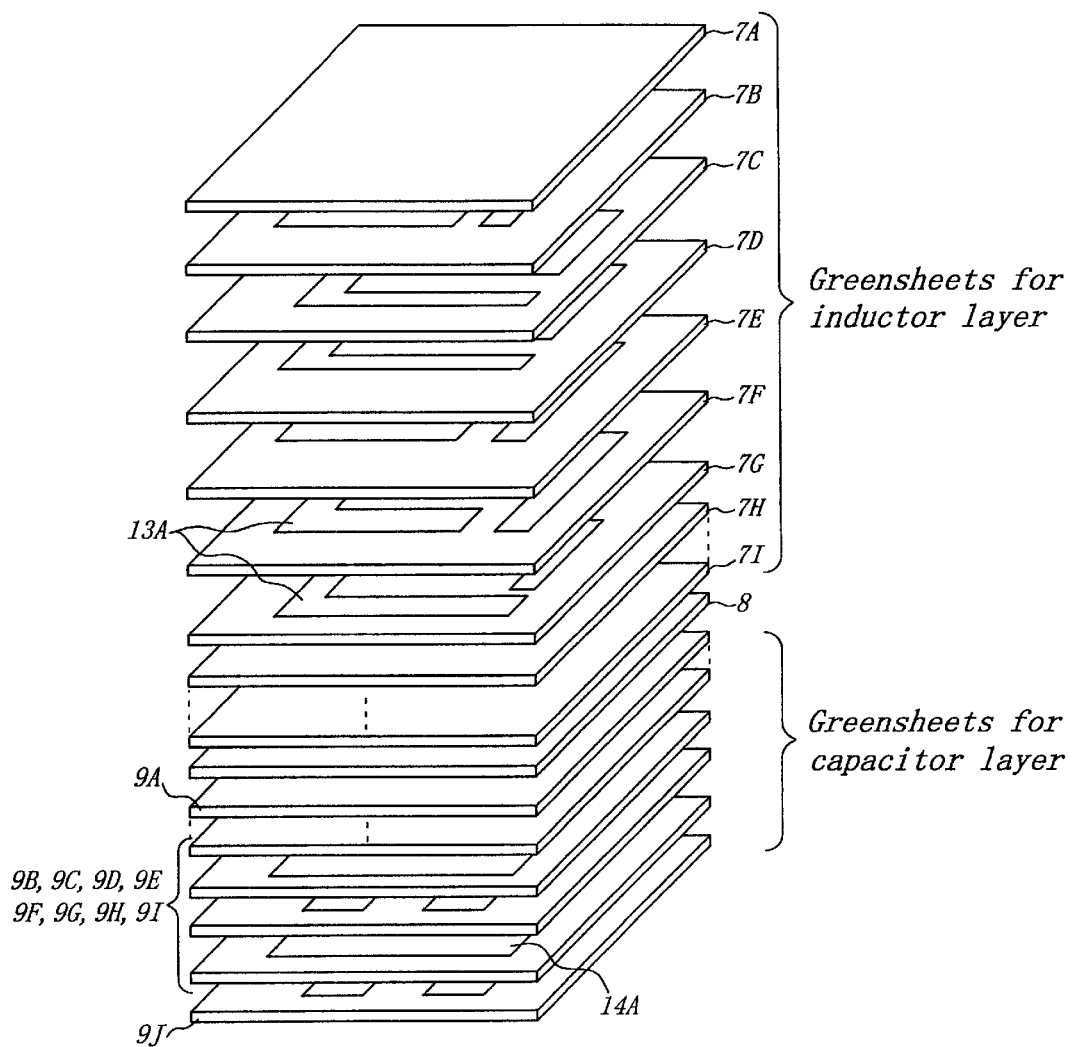
FIG. 2 is a perspective view showing greensheets needed for manufacturing the filter of FIG. 1.

Greensheets shown in FIG. 2 were prepared. For greensheets for an inductor layer, nickel oxide, zinc oxide, copper oxide and ferrous oxide were weighed to a predetermined composition, mixed and calcined to provide a calcined body, which was then granulated to ceramic powder. To the ceramic powder, an organic binder, a plasticizer, a dispersing material and solvents, such as xylene and butanol, were added, blended and shaped by means of a doctor blade method to provide greensheets with thicknesses of 30 to 200 μm. Paste mainly consisting of silver was printed on some of the greensheets.

Zinc Oxide, barium oxide and titanium oxide were weighed to a predetermined composition as shown in tables 1 and 2, mixed and calcined to provide a calcined body, which was then granulated to ceramic powder. To the ceramic powder, $ZnO$—$SiO_2$—$B_2O_3$ series glass powder already granulated was added (the content was varied as shown in tables 1 and 2), and an organic binder, a plasticizer, a dispersing material and solvents, such as xylene and butanol, were further added, blended and shaped by means of a doctor blade method to provide a greensheet 8 with a thickness of 10 to 1000 μm.

Titanium oxide and calcium oxide were weighed to a predetermined composition, mixed and calcined to provide a calcined body, which was then granulated to ceramic powder. To the ceramic powder, $ZnO$—$SiO_2$—$B_2O_3$ series glass powder already granulated was added, and an organic binder, a plasticizer, a dispersing material and solvents, such as xylene and butanol, were further added, blended and shaped by means of a doctor blade method to provide greensheets for a capacitor layer with thicknesses of 10 to 1000 μm. Paste mainly consisting of silver was printed on some of the greensheets.

These greensheets were laminated, heat-pressed and cut into a predetermined shape to provide a cut body, which was then sintered at a temperature of not higher than 1100° C. Paste mainly consisting of silver was printed on the thus obtained sintered body according to an outer electrode pattern and fired to provide an LC filter.

The color of each greensheet for a joining layer 8 was observed visually. Further, the thus obtained LC filter was embedded within a resin body and polished with the surrounding resin. The amount of warp of each filter was measured with an automated dimension measuring apparatus. The specification for the amount of warp of each sintered filter was not larger than 30 μm.

The thickness of the joining layer 4A was also measured on each filter. Aluminum rods, for measuring adhesive strength, were adhered and fixed on the surfaces of the magnetic and dielectric layers, respectively, to provide a sample. The aluminum rods of each sample were fixed in a tensile strength measuring apparatus to measure its tensile strength. The adhesive strength was defined as a value at the moment of fracture. These experimental results are shown in tables 1 and 2.

17 and 18 shown in tables 1 and 2. Consequently, either of or both peaks corresponding to $BaNd_2Ti_5O_{14}$ and $BaNd_2Ti_4O_{12}$ was found.

Then, when the above cut bodies of experimental numbers 16 and 19 before the sintering were subjected to sintering, each body's appearance was observed by means of a heating microscope to take a photograph showing the dielectric layer, magnetic layer and joining layer. In the filter of the number 16 according to the invention, the amount of warp of each functional layer was up to 30 μm. On the contrary, in the filter of the control experimental number 19, the amount of warp of the whole filter was more than 1000 μm.

TABLE 1

| No. | ZnO mol % | BaO mol % | $TiO_3$ mol % | $ZnO-SiO_2-B_2O_3$ glass content weight parts | color of greensheet for intermediate layer | amount of warp after the sintering (μm) | amount of warp during the sintering (μm) | thickness of intermediate layer (μm) | adhesive strength (kgf) |
|---|---|---|---|---|---|---|---|---|---|
| 1 | 10 | 22 | 68 | 2 | gray | 150 | 520 | 80 | 1 |
| 2 | 13 | 22 | 65 | 0.5 | gray | not larger than 30 | 50 | 80 | 15 |
| 3 | 33 | 12 | 55 | 3 | gray | not larger than 30 | 70 | 80 | 26 |
| 4 | 45 | 6 | 49 | 5 | gray | not larger than 30 | 60 | 80 | 9 |
| 5 | 50 | 5 | 45 | 2 | gray | 140 | 410 | 80 | 1 |
| 6 | 37 | 3 | 60 | 2 | gray | 180 | 730 | 80 | 2 |
| 7 | 36 | 5 | 59 | 4 | gray | not larger than 30 | 40 | 80 | 11 |
| 8 | 31 | 12 | 57 | 7 | gray | not larger than 30 | 60 | 80 | 19 |
| 9 | 20 | 45 | 35 | 10 | gray | not larger than 30 | 80 | 80 | 22 |
| 10 | 15 | 50 | 35 | 2 | gray | 130 | 350 | 80 | 1 |

TABLE 2

| No. | ZnO mol % | BaO mol % | $TiO_3$ mol % | $ZnO-SiO_2-B_2O_3$ glass content weight parts | color of greensheet for intermediate layer | amount of warp after the sintering (μm) | amount of warp during the sintering (μm) | thickness of intermediate layer (μm) | adhesive strength (kgf) |
|---|---|---|---|---|---|---|---|---|---|
| 11 | 45 | 40 | 15 | 2 | gray | 140 | 490 | 80 | 0.6 |
| 12 | 44 | 38 | 18 | 1 | gray | not larger than 30 | 50 | 80 | 17 |
| 13 | 32 | 12 | 56 | 8 | gray | not larger than 30 | 70 | 80 | 13 |
| 14 | 14 | 5 | 81 | 2 | gray | not larger than 30 | 40 | 80 | 24 |
| 15 | 12 | 4 | 84 | 2 | gray | 110 | 350 | 80 | 1 |
| 16 | 33 | 12 | 55 | 2 | gray | not larger than 30 | 60 | 80 | 21 |
| 17 | 33 | 12 | 55 | 2 | gray | not larger than 30 | 50 | 80 | not larger than 0.5 |
| 18 | 33 | 12 | 55 | 2 | gray | not larger than 30 | 40 | 80 | 21 |
| 19 | 33 | 12 | 55 | 0 | gray | 230 | not less than 1000 | 80 | not larger than 0.5 |

As can be seen from the results, when adjusting a content of zinc oxide to 12 to 45 mol %, a content of barium oxide to 4 to 45 mol %, a content of $TiO_2$ to 18 to 81 mol % and a content of $ZnO-SiO_2-B_2O_3$ series glass to 0.5 to 10 weight parts, the amount of warp was considerably decreased to not higher than 30 μm.

An X-ray diffraction curve was measured on each sample of experimental numbers of 2, 3, 4, 7, 8, 9, 12, 13, 14, 16, Experiment B LC filters were produced as described in the experiment A, however, manganese oxide or alumina was added to a greensheet for a joining layer. The composition of the greensheet was changed as shown in FIG. 3, which also shows the experimental results.

TABLE 3

| No. | ZnO mol % | BaO mol % | TiO$_2$ mol % | MnO mol % | Al$_2$O$_3$ mol % | ZnO–SiO$_2$–B$_2$O$_3$ glass content weight parts | color of greensheet for intermediate layer | amount of warp after the sintering ($\mu$m) | amount of warp during the sintering ($\mu$m) | thickness of intermediate layer ($\mu$m) | adhesive strength (kgf) |
|---|---|---|---|---|---|---|---|---|---|---|---|
| 21 | 33 | 12 | 55 | 0 | 0.5 | 2 | gray | not larger than 30 | 50 | 80 | 26 |
| 22 | 31 | 12 | 52 | 0 | 5 | 2 | gray | not larger than 30 | 40 | 80 | 22 |
| 23 | 30 | 11 | 49 | 0 | 10 | 2 | gray | not larger than 30 | 30 | 80 | 18 |
| 24 | 29 | 11 | 48 | 0 | 12 | 2 | gray | 70 | 290 | 80 | 2 |
| 25 | 33 | 12 | 55 | 0.1 | 0 | 2 | brown | not larger than 30 | 50 | 80 | 29 |
| 26 | 31 | 12 | 52 | 5 | 0 | 2 | brown | not larger than 30 | 60 | 80 | 20 |
| 27 | 30 | 11 | 49 | 10 | 0 | 2 | brown | not larger than 30 | 50 | 80 | 19 |
| 28 | 29 | 11 | 48 | 12 | 0 | 2 | brown | not larger than 30 | 80 | 80 | not larger than 0.5 |

Consequently, as in experiment A, when adjusting a content of zinc oxide to 12 to 45 mol %, a content of barium oxide to 4 to 45 mol %, a content of TiO$_2$ to 18 to 81 mol % and a content of ZnO—SiO$_2$—B$_2$O$_3$ series glass to 0.1 to 10 weight parts, the amount of warp of each filter was decreased to not higher than 80 $\mu$m during the sintering, and to not higher than 30 $\mu$m after the sintering. Further, the greensheet was colored brown by adding MnO. However, when MnO was added in an amount of more than 10 mol %, the adhesive strength was lowered.

Although the addition of alumina increased considerably the adhesive strength, when alumina was added in an amount of more than 10 mol %, the amount of warp of the filter after the sintering was more than 70 $\mu$m.

Experiment C

LC filters were manufactured as described in experiment A, however, the compositions of the greensheets for joining layers were changed as shown in table 4, showing the experimental results.

Consequently, as in experiment A, when adjusting contents of zinc oxide, barium oxide, titanium oxide, manganese oxide and alumina according to the invention and a content of ZnO—SiO$_2$—B$_2$O$_3$ series glass to 0.1 to 10 weight parts, the amount of warp of each filter was considerably decreased during the sintering. When the amount of the glass was outside of a range of 0.1 to 10 weight parts, the amount of warp was more than 70 $\mu$m.

Experiment D

LC filters were manufactured as described in experiment A, however, the compositions of the greensheets for joining layers were adjusted in the preferred range of the invention and thicknesses of the joining layers were changed. The results are shown in table 5.

TABLE 4

| No. | ZnO mol % | BaO mol % | TiO$_2$ mol % | MnO mol % | Al$_2$O$_3$ mol % | ZnO–SiO$_2$–B$_2$O$_3$ glass content weight parts | color of greensheet for intermediate layer | amount of warp after the sintering ($\mu$m) | amount of warp during the sintering ($\mu$m) | thickness of intermediate layer ($\mu$m) | adhesive strength (kgf) |
|---|---|---|---|---|---|---|---|---|---|---|---|
| 31 | 33 | 12 | 54 | 0.1 | 0.5 | 2 | brown | not larger than 30 | 50 | 80 | 35 larger than 0.5 |
| 32 | 33 | 12 | 54 | 0.1 | 0.5 | 14 | brown | 100 | 420 | 80 | not |
| 33 | 30 | 11 | 49 | 5 | 5 | 2 | brown | not larger than 30 | 60 | 80 | 20 larger than 0.5 |
| 34 | 30 | 11 | 49 | 5 | 5 | 0 | brown | 260 | 920 | 80 | not |
| 35 | 26 | 10 | 44 | 10 | 10 | 2 | brown | not larger than 30 | 60 | 80 | 19 larger than 0.5 |
| 36 | 26 | 10 | 44 | 10 | 10 | 12 | brown | 90 | 310 | 80 | not |
| 37 | 25 | 9 | 42 | 12 | 12 | 2 | brown | 70 | 260 | 80 | 1 |
| 38 | 25 | 9 | 42 | 12 | 12 | 0 | brown | 180 | 660 | 80 | not |

TABLE 5

| No. | ZnO mol % | BaO mol % | TiO₂ mol % | MnO mol % | Al₂O₃ mol % | ZnO–SiO₂—B₂O₃ glass content weight parts | color of greensheet for intermediate layer | amount of warp after the sintering (μm) | amount of warp during the sintering (μm) | thickness of intermediate layer (μm) | adhesive strength (kgf) |
|---|---|---|---|---|---|---|---|---|---|---|---|
| 39 | 33 | 12 | 55 | 1 | 1 | 2 | brown | 70 | 270 | 5 | 1 |
| 40 | 33 | 12 | 55 | 1 | 1 | 2 | brown | 60 | 240 | 10 | 5 |
| 41 | 33 | 12 | 55 | 1 | 1 | 2 | brown | 50 | 190 | 100 | 9 |
| 42 | 33 | 12 | 55 | 1 | 1 | 2 | brown | not larger than 30 | 50 | 200 | 12 |
| 43 | 33 | 12 | 55 | 1 | 1 | 2 | brown | not larger than 30 | 40 | 300 | 23 |
| 44 | 33 | 12 | 55 | 1 | 1 | 2 | brown | not larger than 30 | 50 | 400 | 35 |
| 45 | 33 | 12 | 55 | 1 | 1 | 2 | brown | not larger than 30 | 30 | 500 | 46 |

Consequently, as in experiment A, the amount of warp of each filter was considerably decreased according to the invention. Further, when the thickness of the joining layer was adjusted to not smaller than 30 μm, the amount of warp was considerably lowered and the adhesive strength was considerably improved.

Experiment E

Greensheets shown in FIG. 4 were prepared. In greensheets for a resistor layer, alumina powder and aluminocalcium borosilicate glass were mixed with an organic binder, a plasticizer, a dispersing material and solvents such as xylene and butanol, blended and then shaped by means of a doctor blade method to provide greensheets with thicknesses of 0.01 to 1.0 μm. Paste mainly consisting of silver was printed on some of the greensheets.

33 mol % of zinc oxide, 12 mol % of barium oxide and 55 mol % of titanium oxide were weighed, mixed and calcined to provide a calcined body, which was then granulated to ceramic powder. To the ceramic powder, 2 weight parts of ZnO—SiO₂—B₂O₃ series glass powder already granulated was added, and an organic binder, a plasticizer, a dispersing material and solvents, such as xylene and butanol, were further added, blended and shaped by means of a doctor blade method to provide a greensheet 8 with a thickness of 10 to 1000 μm.

Barium oxide, titanium oxide, neodymium oxide and bismuth oxide were weighed, mixed and calcined to provide a calcined body, which was then granulated to ceramic powder. To the ceramic powder, an organic binder, a plasticizer, a dispersing material and solvents, such as xylene and butanol, were further added, blended and shaped by means of a doctor blade method to provide greensheets for a capacitor layer with thicknesses of 10 to 500 μm. Paste mainly consisting of silver was printed on some of the greensheets.

These greensheets were laminated and heat-pressed to provide a laminated body, which was then cut into a cut body with a pre-determined shape. The cut body was sintered at a temperature of not higher than 1100° C. to obtain a stacked type dielectric filter, whose amount of warp was found to be not larger than 30 μm.

Experiment F

Greensheets as shown in FIG. 6 were prepared. Greensheets for resistor, joining and capacitor layers were manufactured as described in experiment E. Greensheets for an inductor layer were also manufactured, as described in experiment A.

These greensheets were laminated and heat-pressed to provide a laminated body, which was then cut into a cut body with a predetermined shape. The cut body was then sintered at a temperature not higher than 1100° C. to obtain an LCR filter, whose amount of warp was found to be not larger than 30 μm.

What is claimed is:

1. A joining material for an electronic component having a plurality of functional layers each selected from a magnetic layer and a dielectric layer, the functional layers being joined with each other by means of the joining material, the joining material comprising a glass and a composition of a mol % of ZnO, b mol % of BaO and c mol % of TiO₂ (a=12–45, b=4–45, c=18–81, a+b+c=100), wherein 0.1 to 10 weight parts of the glass is added to parts of the composition.

2. The joining material as claimed in claim 1, wherein a content of ZnO is 25 to 40 mol %, a content of BaO is 5 to 15 mol % and a content of TiO₂ is 45 to 65 mol %.

3. The joining material as claimed in claim 1, further comprising not more than 10 mol % of at least one metal oxide selected from a group consisting of Cr₂O₃, Fe₂O₃ and NiO.

4. The joining material as claimed in claim 1, further comprising not more than 10 mol % of at least one metal oxide selected from a group consisting of Y₂O₃ and ZrO₂.

5. The joining material for an electronic component as claimed in claim 1, wherein the glass is selected from a group consisting of ZnO—SiO₂—B₂O₃ glass, PbO—B₂O₃—SiO₂ glass, Al₂O₃—CaO—B₂O₃—SiO₂ glass, B₂O₃—SiO₂ glass, MgO—Al₂O₃—SiO₂ cordierite glass, and ZnO—MgO—Al₂O₃—SiO₂ cordierite glass.

6. An electronic component comprising a joining layer, and a plurality of functional layers, each said functional layer selected from a magnetic layer and a dielectric layer, wherein the joining layer is composed of a sintered product of the joining material as claimed in claim 1.

7. A joining material for an electronic component having a plurality of functional layers each selected from a magnetic layer and a dielectric layer, the functional layers being joined with each other by means of the joining material, the joining material comprising a glass and a composition of a mol % of ZnO, b mol % of BaO, c mol % of TiO₂ and d mol % of MnO (a=12–45, b=4–45, c=18–81, d≦10, a+b+c+d=100), wherein 0.1 to 10 weight parts of glass is added to 100 weight parts of the composition.

8. A joining material for an electronic component having a plurality of functional layers each selected from a magnetic layer and a dielectric layer, the functional layers being joined with each other by means of the joining material, the joining material comprising a glass and a composition of a mol % of ZnO, b mol % of BaO, c mol % of $TiO_2$ and e mol % of $Al2O_3$ (a=12–43, b=4–45, c=18–81, e≦10, a+b+c+e=100), wherein 0.1 to 10 weight parts of the glass is added to 100 weight parts of the composition.

9. A joining material for an electronic component having a plurality of functional layers each selected from a magnetic layer and a dielectric layer, the functional layers being joined with each other by means of the joining material, the joining material comprising a glass and a composition of a mol % of ZnO, b mol % of BaO, c mol % of TiO2, d mol % of MnO and e mol % of $Al_2O_3$ (a=12–45, b=4–45, c=18–81, d≦10, e≦10, a+b+c+d+e=100), wherein 0.1 to 10 weight parts of the glass is added to 100 weight parts of the composition.

10. A method for manufacturing an electronic component having a plurality of functional layers each selected from a magnetic layer and a dielectric layer, the method comprising the steps of:

laminating the functional layers already sintered to provide a laminated body, wherein a layer made of the joining material as claimed in claim 1 is provided, and firing the joining material to form the joining layer.

11. A method for manufacturing an electronic component having a plurality of functional layers each selected from a magnetic layer and a dielectric layer, the method comprising the steps of:

laminating greensheets to provide laminated greensheets, contacting said laminated greensheets with a layer made of the joining material as claimed in claim 1, and firing the laminated greensheets and the layer of the joining material to form a body comprising said functional layers and a fired joining layer.

12. The method as claimed in claim 10, wherein the layer made of the joining material is provided in the form of a greensheet, a paste slurry, or a thin film.

* * * * *